United States Patent [19]
Hagstrom

[11] Patent Number: 5,566,455
[45] Date of Patent: Oct. 22, 1996

[54] ROTARY FILAMENT VEGETATION TRIMMER WITH AIR COOLED FILAMENT

[76] Inventor: Leonard Hagstrom, Rte. 4, Box 97, Ashland, Wis. 54806

[21] Appl. No.: 460,837

[22] Filed: Jun. 5, 1995

Related U.S. Application Data

[63] Continuation of Ser. No. 240,148, May 10, 1994, abandoned.

[51] Int. Cl.⁶ .................................................. B26B 27/00
[52] U.S. Cl. ............................................. 30/276; 56/12.7
[58] Field of Search ..................... 30/276, 347; 56/12.7, 56/17.5

[56] References Cited

U.S. PATENT DOCUMENTS

| | | | |
|---|---|---|---|
| 3,928,911 | 12/1975 | Pittinger, Jr. ............................. | 56/12.7 |
| 4,138,810 | 2/1979 | Pittinger, Sr. et al. .................. | 56/12.7 |
| 4,338,719 | 7/1982 | Burkholder ............................... | 30/276 |
| 4,367,587 | 1/1983 | Kilmer ...................................... | 56/12.7 |
| 4,707,919 | 11/1987 | Tsuchiya .................................. | 30/276 |

*Primary Examiner*—Rinaldi I. Rada
*Assistant Examiner*—Allan M. Schrock
*Attorney, Agent, or Firm*—Laurence R. Brown

[57] ABSTRACT

This rotary filament vegetation trimmer improves the life expectancy of plastic filaments by improved and simplified control of a refrigerated air flow path about the filament of sufficient magnitude to prevent overheating resulting in catastrophic failure from the stresses of twisting as the rotary trimmer head whirls the filament at high rotation speeds. Thus, the head and its filament passageway therethrough are shaped to constitute a centrifugal air pump that draws both air and the filament through the head to position the filament for trimming. The passageway diverges from the shaft into a chamber of significantly increased volume to produce expanding and refrigerated air in the critical region at which the filament curves and induces twisting as the head rotates to tend to heat and cause failure of the plastic filament. The head can thus be made simply in one or two pieces constituting an uppermost rotary shaft with an axial filament feed passageway downwardly through it and flanging outwardly to curve the filament as it passes through the refrigerating chamber normally to the shaft axis to extend outwardly for trimming vegetation. The uppermost member thus may comprise a bell shaped flanged lower mouth of a hollow driveshaft into which an apex of a conically shaped bottom member is directed to form therebetween a conically directed lamination of air dimensioned so that centrifugal force draws air into the hollow drive shaft past the filament to cool it and keep it from melting and failing.

1 Claim, 2 Drawing Sheets

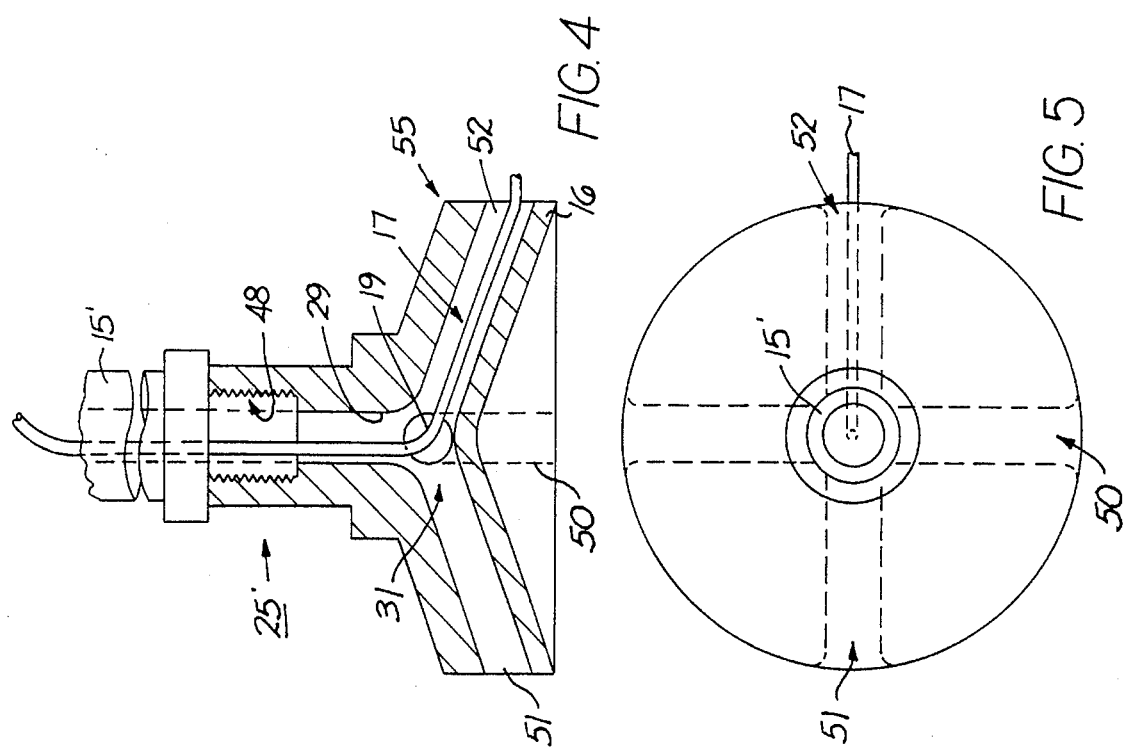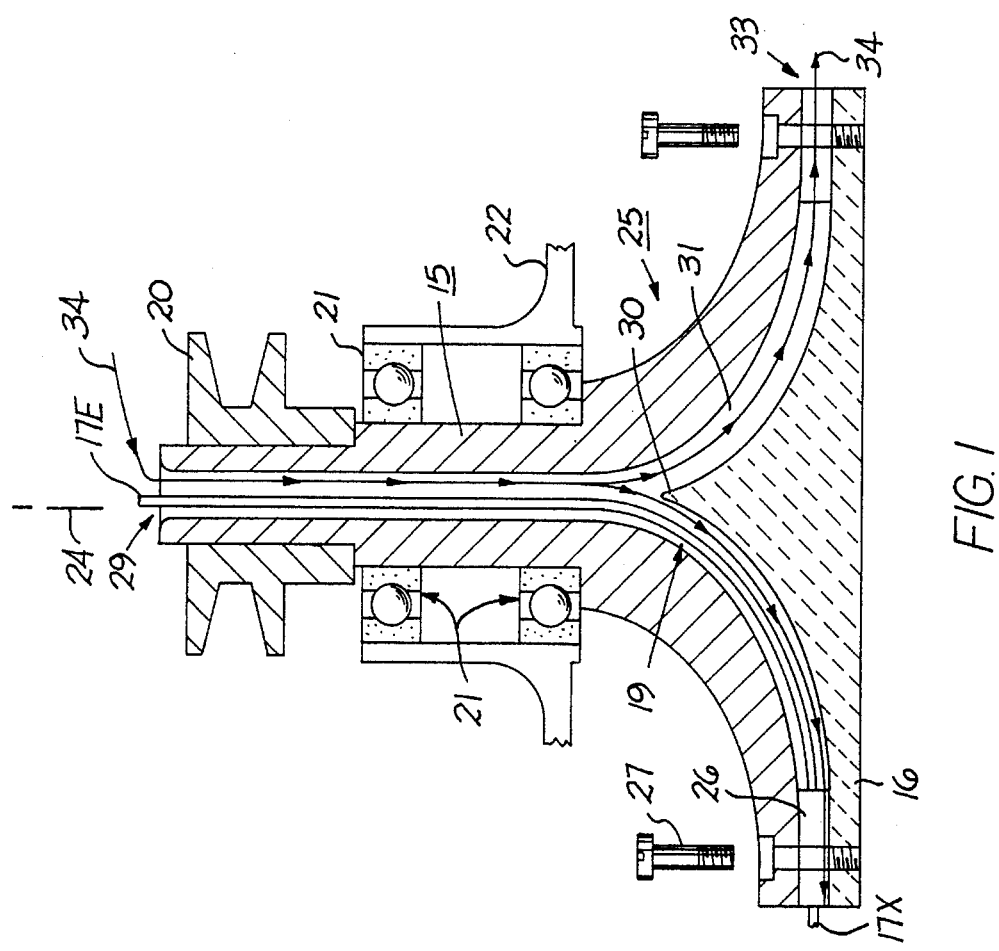

ROTARY FILAMENT VEGETATION TRIMMER WITH AIR COOLED FILAMENT

This application is a continuation of application Ser. No. 08/240,148, filled May 10, 1994, now abandoned.

TECHNICAL FIELD

This invention relates to rotary filament vegetation trimmers, and more particularly it relates to air cooling of plastic filaments to prevent failure from overheating as the filament twists during operation of a rotary cutting head.

BACKGROUND ART

It has been known to use centrifugal force generated by a diverging bell shaped mouth of a rotary filament trimmer to pull a filament axially through a hollow drive shaft to extend from a rotary trimmer head as evidenced by U.S. Pat. No. 3,928,911, Dec. 30, 1975 issued to C. B. Pittinger, Jr. for Hollow-Shaft Feed Filament Trimmer. It was recognized here that the filament spins during rotation and the open bellmouth prevents twisting up of the filament clamped in place and extending through the hollow shaft.

However, this patent did not recognize that the rotating filament in the region where it bends outwardly at the open mouth would encounter twisting stresses which heat the filament to a point of catastrophic failure, and thus produces a limited working life. U.S. Pat. No. 4,338,719, Jul. 13, 1982 to R. F. Burkholder for Filament Type Vegetation Trimmer recognized this problem by finding that heat was generated in the filament in the region where it bends outwardly from its axial traversal down the head drive shaft. The solution provided was incorporation of a special curved filament feed tube and accompanying fan mounted in an air tight housing on the cutter head and rotatable therewith for feeding air past the motor to cool it and then into the curved tube passageway for retaining the filament around the outward bend region, thereby to force air through the curved tube to cool the filament at the bend region where it tends to be heated by rotation of the cutter head.

Several disadvantages are presented by this solution to the filament heating problem. The fan structure is complex, expensive and contributes to unwanted added gyro action of the rotary cutting head. Also the cooling air is first heated by the motor so that the air cooling is not effective. Furthermore the rotatable curved tube tends to dynamically unbalance the cutting head.

It is therefore an objective of this invention to provide a simpler, more efficient air cooling system for the filament in a rotary filament vegetation cutter for improving filament life without the foregoing disadvantages.

Other objects, features and advantages of this invention will be found throughout the following description, drawings and claims.

DISCLOSURE OF THE INVENTION

This invention provides an improved fanless air cooling method and trimmer system for increasing filament life by prevention of thermal fatigue caused by stresses imparted during the rotation of a filament in a 360 degree path by the rotary trimmer head in the region of the outward bend of the filament in the transition region between its vertical path axially down the rotor shaft to its horizontal cutting posture emerging from the rotary trimmer head. Thus, an air flow path for cool air not heated by the drive motor is provided vertically down the rotor shaft and bending through a transition region for horizontal exit from the rotary head. In this air flow path the volume of the filament-airflow passageway as it leaves the hollow motor shaft to bend outwardly into the horizontal cutting posture is rapidly increased in the region about the outward bend by a generally conical diverging configuration.

In this manner a fanless refrigeration is produced which chills the filament in the region about the bend as the air flow path volume rapidly increases thereby expanding and rarifying the air molecules. This well known physics principle is sometimes witnessed at a small leak in a compressed air system which induces frost on hot and humid summer days, or by the cooler air as it passes from the foot up the slopes of a mountain. There is then a synergistic effect from the combined centrifugal force of the rotary trimming head which tends to pull the filament and air out of the head resulting in a rapidly expanding air flow path volume in the region where the filament exits the shaft and bends outwardly so that the region of coolest air is exactly at the position where the filament is receiving the twisting and untwisting stresses tending to heat up the filament and cause failure.

Accordingly this invention provides the method of increasing plastic filament life in rotary filament vegetation trimmers encompassing the steps of: providing a filament passageway axially passing through the drive shaft for the rotatable head and diverging outwardly to a horizontal position substantially normally to the shaft axis, and producing an induced air flow path downwardly into the filament passageway and extending in a closed path through said head diverging from the shaft axis into a rapidly increasing volume air flow chamber in the region that the filament bends outwardly, whereby the expanding air refrigerates the filament in the critical region of twisting when the head rotates to keep the filament chilled and increase filament life by reducing the chance of catastrophic failure from heating of the plastic filament.

A rotary cutting head for a rotary filament vegetation trimmer afforded by this invention therefore provides a substantially cylindrical head configuration closed at a bottom member adapted for disposing adjacent the ground during trimming and having an axially directed rotatable shaft member of smaller diameter extending vertically upwardly from the bottom member. An internal filament and air flow passageway axially extends downwardly through said shaft and diverges over a substantially conical region of substantially greater volume to extend out of the rotatable head normally to the axis of the shaft for trimming vegetation. Thus, air flow is induced by centrifugal action from the rotating head to exit from about the periphery of the head in an air flow channel located between the bottom member and the rotatable shaft member. This flows air past a plastic filament portion bending from vertical to horizontal position through said passageway at its rapidly expanding volume region thereby to refrigerate the filament and prevent heat damage from twisting encountered in rotation of said head.

BRIEF DESCRIPTION OF THE DRAWINGS

In the accompanying drawings, wherein like reference characters refer to similar features throughout the various views:

FIG. 1 is a side view in section of a rotary filament vegetation cutting head fragmental embodiment of a vegetation trimming system and method afforded by this invention illustrating an embodiment assembled from a set of interfitting parts, FIGS. 4 and 5 are respectively a side view in section and a top view of a simplified integral one piece cutting head embodiment of the invention.

THE PREFERRED EMBODIMENTS

Figure 2:
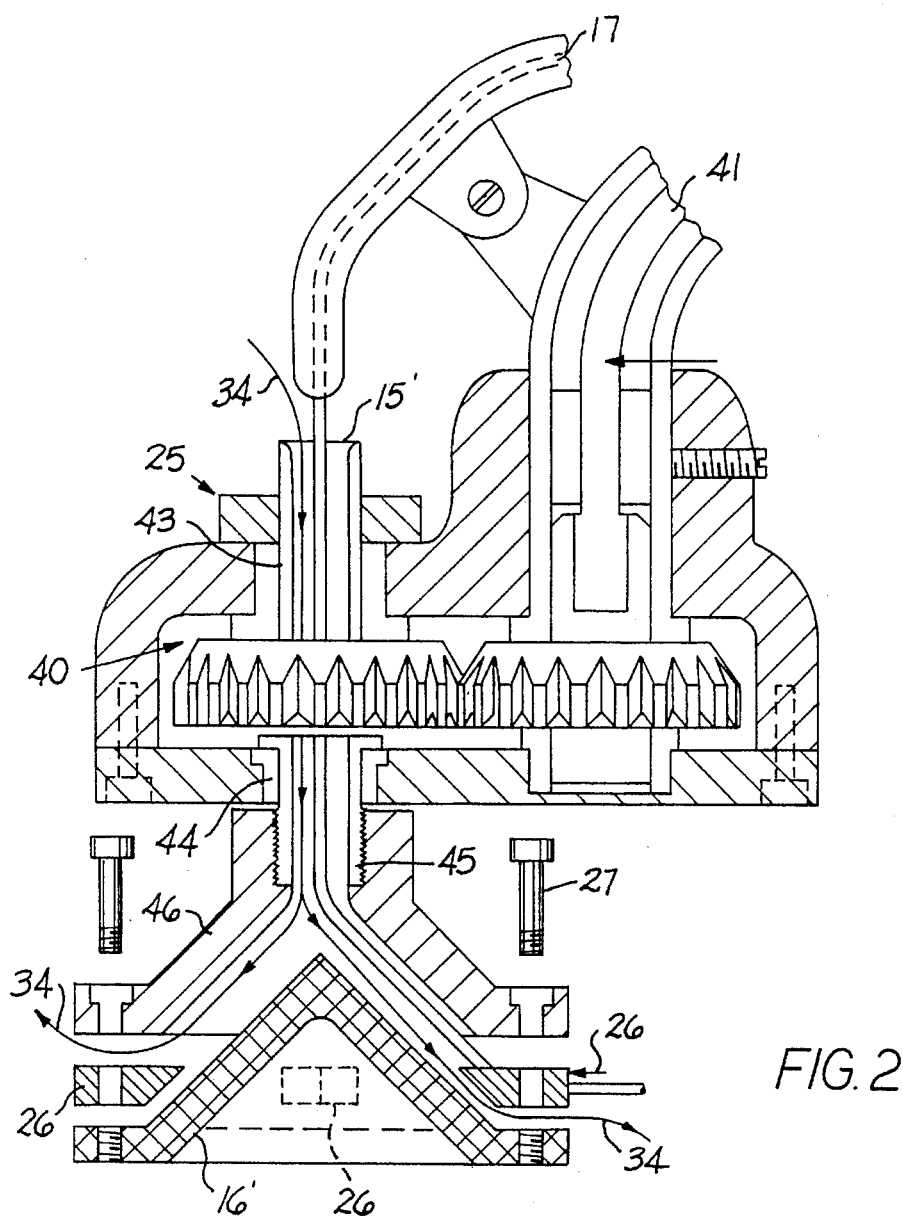
FIGS. 2 is a side view in section of a further multi-part vegetation cutting head fragmental embodiment of the trimming system and method afforded by invention.

In FIG. 1, the cutting head portion of a rotary filament vegetation trimmer is shown in cross section format. The two most significant parts are the drive shaft member 15 and the bottom closure member 16, which may be of a hard plastic material. When the two parts 16, 17 are assembled together they form the novel system of this invention for feeding the plastic filament 17 through the rotary head for trimming vegetation and for protection of the plastic filament from overheating at the critical region of curvature 19 in response to stresses of twisting and untwisting as the rotary head rotates through a revolution.

This head assembly 25 is driven by motor and a belt (not shown) at pulley 20 to rotate driveshaft 15 about the driveshaft axis 24 together with accompanying closure member 16 as journalled in the bearings 21 mounted in the framework 22 carrying the head assembly 25. Note that by use of the pulley, the hot air about the drive motor is separated from the air input path 34 to the hollow drive shaft aperture 29, to assure cooler input air. In this embodiment the closure member 16 is a separate body spaced from the separate shaft body 15 by spacers 26 and fastened thereto for common rotation about axis 24 by the bolts 27. The generally conically shaped closure member 16 has apex 30 directed along axis 24 into the outlet shaft aperture bore 29 to provide a region 31 of rapidly increasing volume. The spacing between the shaft member 15 and the closure member 16 is about the same thickness 33 as the diameter of the shaft aperture 29. Thus the air flow 34, which is induced downwardly in the shaft 15 by means of the centrifugal force of the rotating mass of the head, enters the chamber 31 of substantially increased volume. This rapid expansion of the air in chamber 31 rarifies the air to chill it and thus serve as a refrigeration system for the filament 17 at the critical bend area 19 where heating of the plastic filament 17 is generated by rotation of the head. The centrifugal force and accompanying flow of air also creates a vacuum effect better serving to feed the filament and air through the cutting head from its entrance position 17E to exit at 17X horizontally for cutting vegetation.

In general the hollow drive shaft member 15 is flanged outwardly at a lower extremity to produce a diverging open mouth into which the bottom mouth closure member 16 presents a substantially conical shaped upper surface with an apex directed axially into said mouth to form between the two members an air flow and filament passageway extending downwardly through said shaft and exiting horizontally from the peripheral circumferential edge formed by the generally cylindrical lower portion of the cutting head 25. The shaft 15 and bottom 16 members form an air flow passageway of restricted dimensions that produces by centrifugal force as the head rotates axially oriented air flow into the upper open end of shaft 15 to exit horizontally from about the lower peripheral edge of the head. The air flow path as restricted by the closure member 16 assures that the refrigerated air in chamber 19 reaches the curvature 19 of filament 17 rather than being dissipated in the atmosphere in general. The head assembly 25 may be formed either from an assembly of parts or as an integral configuration of said bottom closure member 16 and shaft member 15.

Whatever the configuration of the cutting head 25, this invention provides a novel mode of operation that more effectively, with simpler cutting head structure cools the plastic filament 17 in the critical region 19 where the plastic becomes heated by the stresses of twisting for each rotation of the head, since the top end of the filament 17E is somehow clamped in place so that it cannot rotate during the trimming operation to thereby prevent undesired feeding of the filament from a spool or other store (not shown).

This novel method of increasing plastic filament life in rotary filament vegetation trimmers encompasses the steps of: providing in a rotary cutter head member coupled to a drive shaft for rotation thereof a filament passageway axially passing through the drive shaft and entering a chamber of significantly larger volume diverging outwardly from the axial passageway wherein the filament curves to extend horizontally from the head member for cutting vegetation, and producing an induced air flow path downwardly into the filament passageway and extending through said chamber by centrifugal forces induced by rotation of said head member, whereby expanding air in the chamber refrigerates the curved filament in the chamber when the head rotates to increase filament life thereby reducing the chance of catastrophic failure from heating of the plastic filament.

Figure 3:
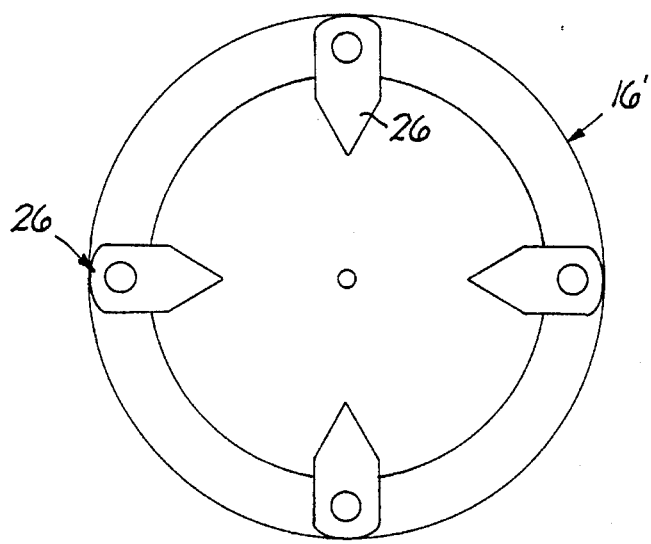
FIG. 3 is a top view of a bottommost closure member of FIG. 2 with superimposed spacer elements.

The embodiment of FIGS. 2 and 3 is adapted for gear drive in gearbox 40 by means of a flexible rotating shaft 41 coming from the drive motor (not shown). The cutting head 25 drive shaft 15' is journalled for rotation in bearing sleeves 43, 44, and is sweated at 45 to the mouthpiece 46, which cooperates in the manner aforesaid with the generally conically shaped closure member 16'.

The embodiment of FIGS. 4 and 5 illustrates an integral single piece rotary cutting head 25' that may be screwed at 48 onto an existing hollow drive shaft 15' which freely permits air and the filament 17 to enter and pass through the head with the refrigerating action heretofore explained. Thus the rotary head 25' as seen in FIG. 5 has a set of upwardly slanted bores 50, 51, 52, etc. that merge together in the cavity at the bottom of the vertical aperture 29 through the shaft. In essence these are conically shaped slices dispersed through the head. This creates the rapid expansion heretofore explained, in this case about four to one of volume of the air flow path, which creates the refrigeration action in the critical position 19 where the filament 17 tends to heat.

Thus the simplified rotary filament vegetation trimmer cutting head 25' of this embodiment has a plastic filament and accompanying air flow path therethrough constructed with a vertical hollow shaft 29 extending partially through the head, and with a generally cylindrical lower extremity 55 having a set of upwardly sloping apertures 50, 51, 52 thereinto merging in a chamber region 31 communicating with the vertical hollow shaft 29. While the hatching in this embodiment denotes metal, the head may be of a suitable hard plastic.

Having therefore advanced the state of the art in providing improved and simplified rotary vegetation trimming methods and apparatus with longer filament life, those features of novelty setting forth the spirit and nature of the invention are defined with particularity in the following claims.

I claim:

1. A rotary filament vegetation trimmer cutting head having a plastic filament of predetermined diameter and an accompanying air flow path about the filament extending through the cutting head, said cutting head being constructed with a vertical hollow shaft of a diameter significantly exceeding that of the filament diameter extending partially through the head to form part of the air flow path, and with a generally cylindrical closed bottom lower extremity forming a set of radially exiting cylindrical holes sloping upwardly from side walls of the generally cylindrical lower extremity and merging in a chamber region communicating with the vertical hollow shaft, and filament cooling means including said chamber region and said holes which define a greater volume than the hollow shaft for substantially greater air flow volume than the vertical hollow shaft causing air through the air flow path to expand rapidly about the plastic filament entering the chamber region for cooling the filament residing in the chamber region and thereby significantly lengthening the working filament life.

* * * * *